Figure 1:
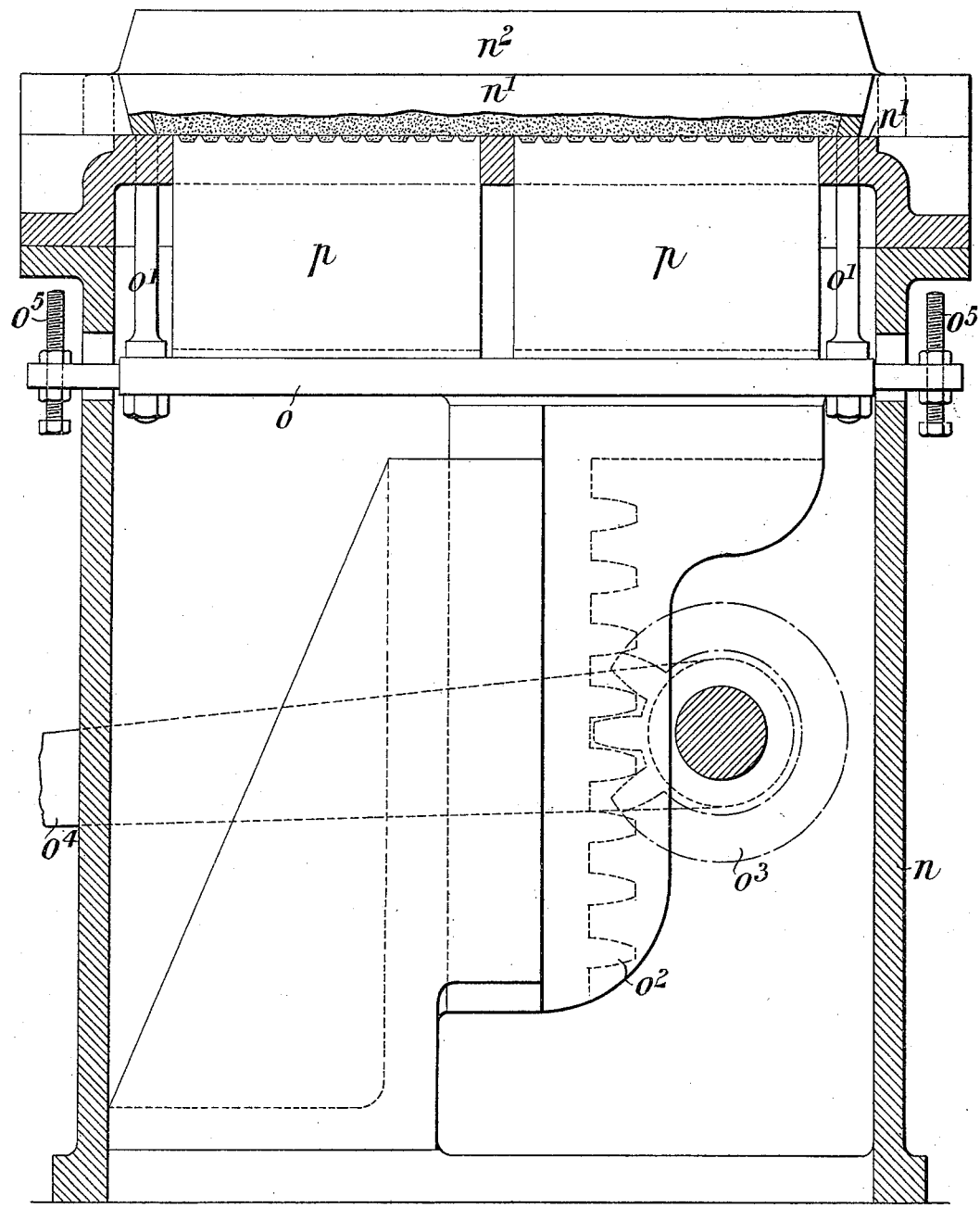

No. 640,126. Patented Dec. 26, 1899.
F. T. GILES.
MOLDING APPARATUS FOR MAKING CORES FOR FORMING NICKS, &c., IN HEADS OF CAST SCREWS, &c.
(Application filed Aug. 2, 1899.)
(No Model.) 2 Sheets—Sheet 1.

Witnesses
J. D. Kingsbury
B. W. Brackett

Inventor
Frederick T. Giles
By J. Whitaker Prevost Atty.

THE NORRIS PETERS CO., PHOTO-LITHO., WASHINGTON, D. C.

No. 640,126. Patented Dec. 26, 1899.
F. T. GILES.
MOLDING APPARATUS FOR MAKING CORES FOR FORMING NICKS, &c., IN HEADS OF CAST SCREWS, &c.
(Application filed Aug. 2, 1899.)
(No Model.) 2 Sheets—Sheet 2.
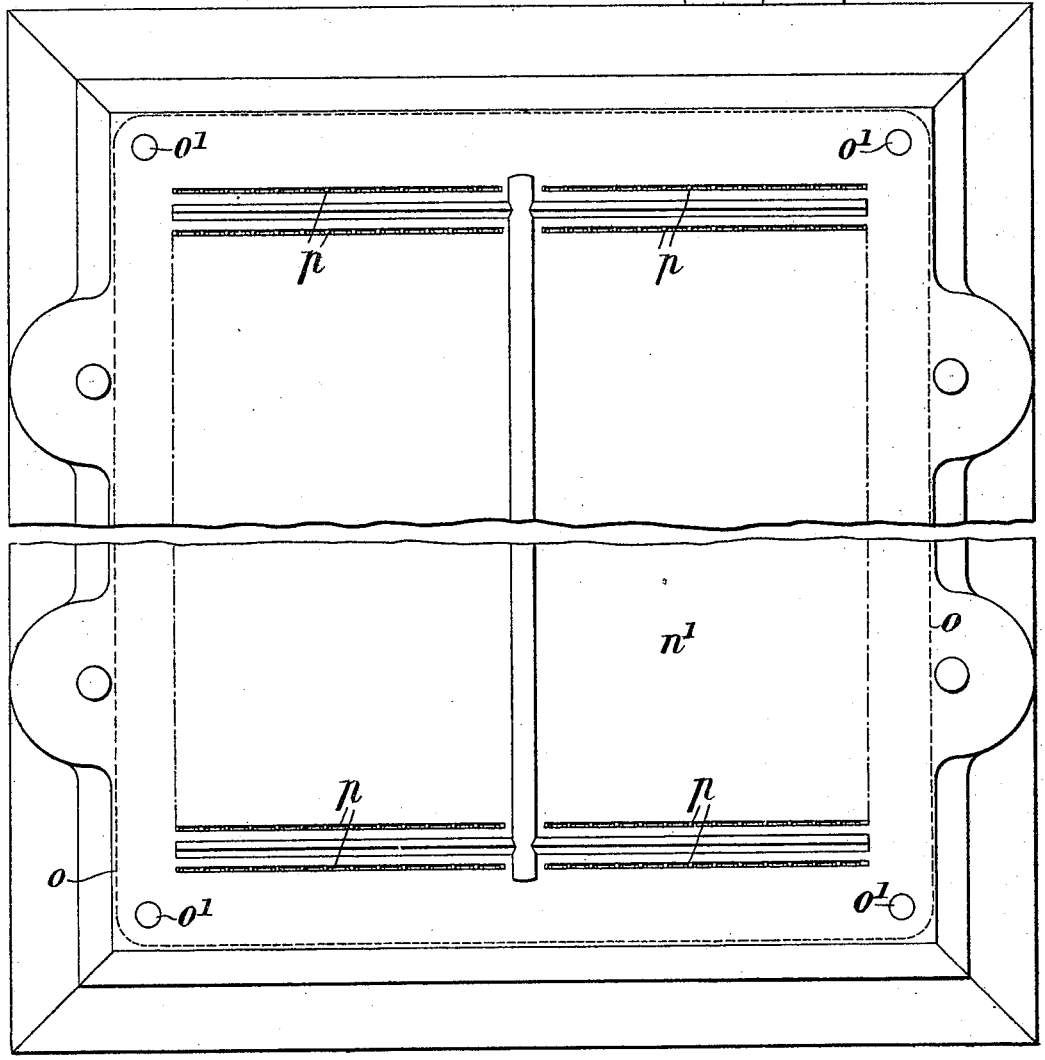
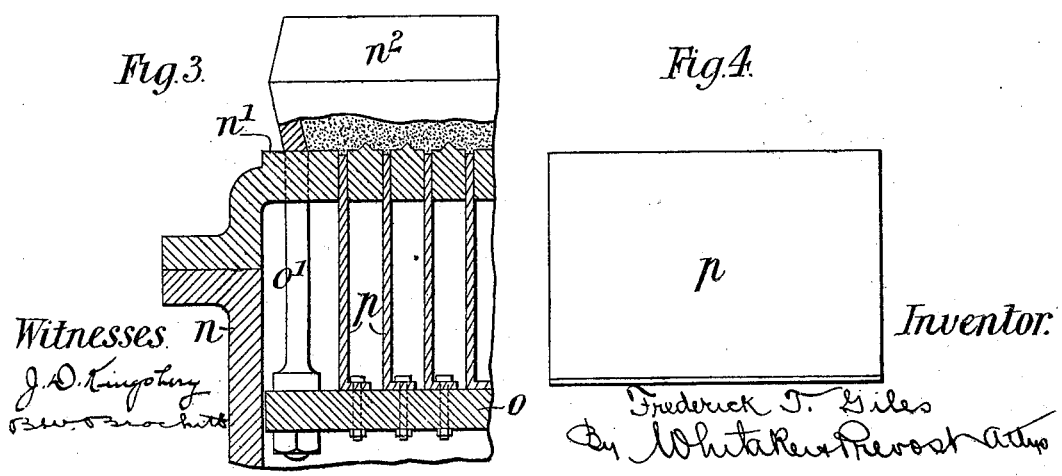
Witnesses
J. D. Kingsbury
Inventor
Frederick T. Giles
By Whitaker Prevost Attys

UNITED STATES PATENT OFFICE.

FREDERICK THEOPHILUS GILES, OF BRISTOL, ENGLAND.

MOLDING APPARATUS FOR MAKING CORES FOR FORMING NICKS, &c., IN HEADS OF CAST SCREWS, &c.

SPECIFICATION forming part of Letters Patent No. 640,126, dated December 26, 1899.

Application filed August 2, 1899. Serial No. 725,898. (No model.)

*To all whom it may concern:*

Be it known that I, FREDERICK THEOPHILUS GILES, a subject of the Queen of Great Britain, residing at Bristol, England, have invented new and useful Improvements in Molding Apparatus for Making Cores for Forming Nicks, Holes, or Recesses in the Heads of Cast Screws, Bolts, and other Articles, of which the following is a specification.

My invention relates to molding apparatus for making cores for forming nicks, holes, or recesses in the heads of cast screws, bolts, and similar articles.

In the accompanying drawings, Figure 1 is a sectional elevation of my molding apparatus for forming cores for the nicked or recessed heads of wood screws, bolts, &c. Fig. 2 is a plan thereof, and Figs. 3 and 4 are views of details.

$n$ is a frame carrying a molding-plate $n'$ to receive the molding-box $n^2$ in the ordinary manner.

$o$ is a plate which is provided with a number of vertical plates or strips $p$, (shown more clearly in the detail views Figs. 3 and 4,) which register with and are adapted to move vertically through slots in the molding-plate $n'$. These plates can be made the whole length of the molding-box or in sections, and they can have a serrated upper edge, as shown in Fig. 1, to correspond with the notches in the different screw-heads, or they can be plain, as shown in Fig. 4, so that a continuous core is formed the whole length of each row or spray.

The plate $o$ is also provided with a number of upright rods or bars $o'$, the upper ends of which bear against the under side of the molding-box $n^2$, with a rack $o^2$, which is adapted to be moved in a vertical plane by the pinion $o^3$ and lever $o^4$ or by other suitable means, and with adjustable stops $o^5$, which limit its upward movement by coming into contact with the under side of the flange at the upper end of the frame $n$. With this arrangement, the plate $o$, with the molding-strips $p$ and the fixed rods $o'$, being in the lowermost position—that is to say, with the upper ends of the rods $o'$ flush with the upper face of the molding-plate $n'$—the molding-box $n^2$ is placed in position upon the molding-plate $n'$ and is filled and rammed with sand, so as to thereby form the mold with projecting cores for making the nicks in the heads of the screws, &c. The plate $o$ is now raised through the medium of the lever $o^4$, pinion $o^3$, and rack $o^2$, so that both the molding-box and the molding-strips $p$ are simultaneously raised thereby, allowing the cores formed to be removed from the molding-plate without being broken off.

Instead of the rack $o^2$ and pinion $o^3$ I can employ other suitable means for raising and lowering the support $o$—such, for example, as screw-gear. Furthermore, in lieu of making the support $o$ movable and the molding-plate $n'$ fixed I can make the support $o$ fixed and the molding-plate movable.

It will be understood that I can mold square or other shaped holes or recesses instead of the usual nicks in the heads of screws, bolts, nails, &c.

Having now particularly described and ascertained the nature of my said invention and in what manner the same is to be performed, I declare that what I claim is—

1. In an apparatus for forming the cores for the nicks, holes or recesses in the heads of screws, the combination with the main frame provided with a horizontal stationary molding-plate having a plurality of narrow slots therein, a vertically-movable plate below said molding-plate provided with a series of vertical core-plates engaging said slots and having portions normally lying below the top of the molding-plate, to form the cores, a plurality of rods secured to said movable plate and extending through said molding-plate to engage and elevate the molding-box, means for raising and lowering said vertically-movable plate, and an adjustable stop secured to said movable plate in position to engage a stationary part of the frame to limit the upward movement of the said movable plate, substantially as described.

2. In an apparatus for forming the cores for the nicks, holes or recesses in the heads of screws, the combination with the main frame provided with a horizontal stationary molding-plate having a plurality of narrow slots therein, a vertically-movable plate below said molding-plate provided with a series of vertical core-plates engaging said slots and having their upper edges provided with notches extending below the face of the molding-plate, when the said movable plate is in its lowest position, to form a series of rows of nick-cores, a plurality of rods secured to said movable plate and extending upward through the molding-plate to engage and elevate the
5 molding-box, means for raising and lowering the said movable plate, and an adjustable stop on said movable plate in line with and adapted to engage a stationary portion of the frame to limit the upward movement of the movable plate, substantially as described.

FREDERICK THEOPHILUS GILES.

Witnesses:
W. MARK CLARKE,
LIONEL A. WILSON.